Patented May 24, 1932

1,859,738

UNITED STATES PATENT OFFICE

ERLING JOHNSON, OF ODDA, NORWAY, ASSIGNOR TO THE FIRM ODDA SMELTEVERK A/S, OF ODDA, NORWAY

PROCESS OF MANUFACTURING FERTILIZERS

No Drawing. Application filed September 24, 1930, Serial No. 484,242, and in Norway September 28, 1929.

In my U. S. Patent 1,816,285, a process of treating phosphate rock with nitric acid is described which consists in dissolving phosphate rock in nitric acid so that a solution of calcium nitrate and free phosphoric acid are obtained according to the reaction:

(1) $Ca_3(PO_4)_2 + 6HNO_3 =$
$2H_3PO_4 + 3Ca(NO_3)_2$ and in eliminating from this solution the most essential part of the calcium nitrate by crystallization so that after filtration from the crystals a phosphoric acid containing mother liquor is obtained.

The present process relates to a further treatment of the calcium nitrate and of the remaining phosphoric acid solution obtained in this manner for the purpose of preparing high grade three-componential fertilizers practically without any content of inactive material.

For this purpose the said mother liquor may be used directly because the rest of calcium present in the liquor may by suitable measures be reduced to one or two per cent, quantities which practically are insignificant even if the finished product is desired to contain essentially water soluble phosphoric acid. The rest of calcium in the mother liquor may however be totally removed by precipitation with sulphuric acid, alkali—or ammonium sulphates or—bisulphates as mentioned in my pending Patent Application 391,507. Further the rest of calcium may be precipitated by means of hydrofluoric acid, alkali fluorides, ammonium fluorides and the like. The so obtained precipitate of calcium compounds may in known manner be utilized for recovering the precipitants. As compared with other processes in the field in question the use of the said mother liquor has the great merit, that but very small quantities of calcium are to be removed by precipitation and that correspondingly small portions of precipitants need be circulated.

If only a relatively minor quantity of calcium nitrate is crystallized out from the initial solution, the mother liquor may be utilized for manufacturing three-componential fertilizers in which calcium di-phosphate is the phosphoric acid component and the phosphoric acid is citrate-soluble.

The distinguishing feature of the present process is now, firstly, that the calcium nitrate obtained by crystallization from the solution of phosphate rock is by means of potassium chloride or potassium sulphate converted into potassium nitrate and calcium chloride, respectively calcium sulphate, which two mentioned products are leaving the process as a solution respectively as a precipitate.

The reactions in question are:

(2a) $3Ca(NO_3)_2 + 6KCl_1 =$
$3CaCl_2 + 6KNO_3.$ (2b) $3Ca(NO_3)_2 + 3K_2SO_4 =$
$3CaSO_4 + 6KNO_3.$

The potassium nitrate is crystallized from the solution. This crystallized potassium nitrate is then mixed in desired quantities with the mother liquor above mentioned, eventually after this latter has been treated in the described manner, for precipitation of its small content of lime, whereupon neutralization with ammonia may take place, for instance in proportions as given in the following equation:

(3) $2H_3PO_4 + 4KNO_3 + 4NH_3 =$
$2(NH_4)_2HPO_4 + 4KNO_3.$

In this equation the small quantities of calcium nitrate and nitric acid which may be present in the mother liquor are not considered.

If relatively minor quantities of calcium nitrate are crystallized from the initial solution of phosphate rock in nitric acid, so that relatively much calcium nitrate is present in the mother liquor three componential compound fertilizers may be obtained with diphosphate as phosphoric acid component f. inst. according to the following reaction:

(4) $2H_3PO_4 + 2Ca(NO_3)_2 + 2KNO_3 + 4NH_3 =$
$2CaHPO_4 + 2KNO_3 + 4NH_4NO_3.$

It is evident that according to the present process it is possible to obtain three-componential fertilizers with any desired ratio between the plant-food components. It is of course not necessary that the total quantity of potassium nitrate which may be obtained from the available calcium nitrate is mixed with the mother liquor. Likewise it is not neccessary to convert all the calcium nitrate obtained from the primary solution into potassium nitrate for admixture to the fertilizer product.

If desired the phosphoric acid solution (mother liquor) may be neutralized with ammonia before the potassium nitrate is added. And the product of neutralization may even be brought to dryness before the addition of potassium nitrate. Such manners of working do not however involve any advantage.

The mixture of the phosphoric acid containing mother liquor and potassium nitrate is very conveniently neutralized with ammonia in the manner, that the mixed warm solution in the finely divided state, as f. instance by means of an atomizing device, is introduced into an atmosphere of ammonia gas. By the heat of neutralization a considerable part of the water present is evaporated. If the mixed solution is sufficiently concentrated it is in this way possible to obtain immediately a dry neutralized product. If it is necessary additional heat may however be supplied for instance by means of hot air or in any other way. The distribution of the phosphoric acid containing mixture in ammonia gas may be effected in any other suitable manner as f. inst. in mixing tanks with stirring devices, in suitable closed screw conveyors and the like, to which apparatus the ammonia gas is supplied in countercurrent to the acid liquor while water is evaporated and the neutralized product is removed continuously in the dry state.

As compared with previously known processes for manufacturing universal compound fertilizers from phosphate rock and potassium chloride (or sulphate) the above described manner of working is evidently very much simpler. Only three reaction steps are to be performed, and all of them are very simple and easy to carry out. The finished product is directly obtained and no complicated circulation of auxiliary agents is necessary.

The obtained by-product of calcium chloride or calcium sulphate is leaving the process as a concentrated solution respectively as a precipitate. These by-products may in known manner be utilized for preparation of the corresponding ammonium salts by treating them with ammonia and carbonic acid.

The present process represents a novel combination of operations for manufacturing concentrated fertilizers of universal composition from phosphate rock. The phosphate rock is first transformed into crystallized calcium nitrate and a phosphoric acid solution. The calcium nitrate is converted into potassium nitrate and this latter is added to said phosphoric acid solution, and the mixture is neutralized with ammonia and brought to dryness. This combination utilizes the calcium content of the phosphate rock, which is important economically as the cost of lime is saved. But above all the process constitutes important progress, because it allows to make compound fertilizers in which the content of potash may be varied quite at will. This is due to the fact that the two constituents of the phosphate rock, lime and phosphoric acid, are first won as separate products. In prior processes for preparing universal compound fertilizers from phosphate rock, the latter was treated with nitric acid in presence of potassium salts, and therefore the content of potash in the finished product was necessarily determined by the lime content of the phosphate rock. Further the new process may be carried out with much better economy because the phosphoric acid solution (mother liquor) may be used in high concentration, so that evaporation costs are saved, and the washing operation is rendered more simple and cheaper, and no phosphoric acid is lost in the process.

I claim:

1. Process of manufacturing universal fertilizers from phosphate rock and potassium salts, comprising dissolving phosphate rock in nitric acid to form a solution, crystallizing calcium nitrate from said solution, separating the nitrate crystals from the mother liquor, converting the calcium nitrate by means of potassium salts into potassium nitrate, mixing a convenient portion of the potassium nitrate with the mother liquor from the crystallization of calcium-nitrate, drying the product.

2. Process of manufacturing fertilizers from phosphate rock and potassium salts, comprising dissolving phosphate rock in nitric acid to form a solution, crystallizing calcium nitrate from said solution separating the nitrate crystals from the mother liquor, freeing this mother liquor from a rest of calcium by precipitation with any suitable means, converting the calcium nitrate by means of potassium salts into potassium nitrate, mixing a convenient portion of this potassium nitrate with the purified mother liquor, neutralizing the mixture with ammonia and drying the product so obtained.

3. Process of manufacturing universal fertilizers from phosphate rock and potassium salts, comprising dissolving phosphate rock in nitric acid to form a solution, crystallizing calcium nitrate from said solution, separating the nitrate crystals from the mother liquor, converting the calcium nitrate by means of potassium salts into potassium nitrate, mixing a convenient portion of the potassium nitrate with the mother liquor from the crystallization of calcium nitrate, neutralizing the mixture with ammonia by injecting the mixture in a finely divided state into a container into which ammonia gas is simultaneously introduced, and bringing the product to dryness.

4. Process of manufacturing universal fertilizers from phosphate rock and potassium salts, comprising dissolving phosphate rock in nitric acid to form a solution, crystallizing calcium nitrate from said solution, separating the nitrate crystals from the mother liquor, converting the calcium nitrate by means of potassium salts into potassium nitrate, mixing a convenient portion of the potassium nitrate with the mother liquor from the crystallization of calcium nitrate, neutralizing the mixture with ammonia by causing it to pass a stirring apparatus in counter-current with ammonia gas and bringing the product of neutralization to dryness.

In testimony that I claim the foregoing as my invention I have signed my name.

ERLING JOHNSON.